(12) United States Patent
Okamoto et al.

(10) Patent No.: US 11,203,475 B2
(45) Date of Patent: Dec. 21, 2021

(54) LAMINATE, BLISTER CONTAINER, AND PUSH-THROUGH PACKAGE

(71) Applicant: FUJIMORI KOGYO CO., LTD., Tokyo (JP)

(72) Inventors: Hajime Okamoto, Tokyo (JP); Hidekazu Furukawa, Tokyo (JP); Takeo Matsuyama, Tokyo (JP); Toyoaki Suzuki, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 66 days.

(21) Appl. No.: 16/493,757

(22) PCT Filed: Mar. 12, 2018

(86) PCT No.: PCT/IB2018/000231
§ 371 (c)(1),
(2) Date: Sep. 13, 2019

(87) PCT Pub. No.: WO2018/167557
PCT Pub. Date: Sep. 20, 2018

(65) Prior Publication Data
US 2021/0094738 A1     Apr. 1, 2021

(30) Foreign Application Priority Data
Mar. 17, 2017   (JP) .............................. JP2017-053663

(51) Int. Cl.
| B32B 27/32 | (2006.01) |
| B65D 65/40 | (2006.01) |
| B32B 27/08 | (2006.01) |
| B32B 27/28 | (2006.01) |

(Continued)

(52) U.S. Cl.
CPC .............. *B65D 65/40* (2013.01); *B32B 27/08* (2013.01); *B32B 27/28* (2013.01); *B32B 27/32* (2013.01);
(Continued)

(58) Field of Classification Search
CPC ............ B32B 2250/03; B32B 2250/05; B32B 2250/24; B32B 2250/40; B32B 2270/00;
(Continued)

(56) References Cited

U.S. PATENT DOCUMENTS

| 2003/0008152 A1 | 1/2003 | Tsai et al. |
| 2006/0014022 A1 | 1/2006 | Kendig et al. |
| 2015/0125676 A1 | 5/2015 | Mizutani |

FOREIGN PATENT DOCUMENTS

| CN | 1222408 C | 10/2005 |
| CN | 101052676 A | 10/2007 |

(Continued)

OTHER PUBLICATIONS

International Preliminary Report on Patentability dated Sep. 17, 2019 for PCT/IB2018/000231 and English translation thereof; 11 pgs.

(Continued)

*Primary Examiner* — Lawrence D Ferguson
(74) *Attorney, Agent, or Firm* — Hauptman Ham, LLP

(57) ABSTRACT

A laminate has a substrate layer, an intermediate layer, and a fluorine-based resin layer in this order, and has a total film thickness of 400 μm or less, in which a thickness of the intermediate layer is 5 μm or more and 50 μm or less, and an upper yield point stress of the laminate is 1,500 N/cm² or more.

7 Claims, 1 Drawing Sheet

(51) Int. Cl.
*B32B 27/38* (2006.01)
*B65D 75/32* (2006.01)

(52) U.S. Cl.
CPC .............. *B32B 27/38* (2013.01); *B65D 75/32* (2013.01); *B32B 2250/03* (2013.01); *B32B 2250/05* (2013.01); *B32B 2250/24* (2013.01); *B32B 2307/54* (2013.01); *B32B 2307/7246* (2013.01); *B32B 2439/70* (2013.01); *B32B 2439/80* (2013.01)

(58) Field of Classification Search
CPC ............ B32B 2274/00; B32B 2307/54; B32B 2307/7246; B32B 2307/732; B32B 2439/70; B32B 2439/80; B32B 27/08; B32B 27/28; B32B 27/30; B32B 27/302; B32B 27/304; B32B 27/32; B32B 27/322; B32B 27/38; B32B 7/12; B65D 65/40; B65D 75/32
See application file for complete search history.

(56) References Cited

FOREIGN PATENT DOCUMENTS

| | | |
|---|---|---|
| EP | 3553145 A1 | 10/2019 |
| EP | 3575088 A1 | 12/2019 |
| JP | S6245640 A | 2/1987 |
| JP | 2004-501799 A | 1/2004 |
| JP | 2008-507597 A | 3/2008 |
| JP | 2012-135980 A | 7/2012 |
| JP | 2014-028508 A | 2/2014 |
| JP | 2014-218633 A | 11/2014 |
| JP | 2015171772 A | 10/2015 |
| JP | 2016055639 A | 4/2016 |

OTHER PUBLICATIONS

Extended European Search Report for European Patent Application No. 18768230.7; dated Sep. 18, 2020; 7 pgs.
International Search Report dated Jun. 12, 2018 for PCT/IB2018/000231 and English translation; 5pgs.
Office Action for Chinese Patent Application No. 201880018628.0 dated Dec. 11, 2020 with English Summary, 5 pgs.
Office Action in corresponding Japanese Patent Application No. 2017-053663 dated Feb. 24, 2021 with English translation, 8 pgs.
Office Action in corresponding Chinese Patent Application No. 201880018628.0 dated Apr. 25, 2021 with English summary, 5 pgs.
Office Action in Corresponding Indonesian Patent Application No. P00201909080 dated Jun. 21, 2021; 10 pgs.
Office Action in Corresponding Japanese Patent Application No. 2017-053663 dated Oct. 5, 2021, 6 pgs.

LAMINATE, BLISTER CONTAINER, AND PUSH-THROUGH PACKAGE

CROSS REFERENCE TO RELATED APPLICATION

This application is a National Phase of PCT/IB2018/000231 filed on Mar. 12, 2018, which, in turn, claimed the priority of Japanese Patent Application No. 2017-053663 which was filed on Mar. 17, 2017.

TECHNICAL FIELD

The present invention relates to a laminate, a blister container, and a press-through package.

BACKGROUND TECHNOLOGY

A film laminate having high barrier properties is used in packaging materials for foods, medicines, and the like. In the pharmaceutical field, for individual packaging of tablets and capsules, a press-through package (hereinafter, may be referred to as "PTP") is used.

For suppressing deterioration of the content, a resin film that is a PTP forming material is required to have barrier properties to water vapor. Furthermore, generally, since PTP is manufactured by deep draw molding, a resin film that is a PTP forming material is required to have good moldability. For example, Patent Documents 1 and 2 describe a laminate in which a fluorine-based resin film is laminated in order to improve barrier properties to water vapor.

DOCUMENTS OF RELATED ART

Patent Documents

Patent Document 1: Japanese Unexamined Patent Application, First Publication No. 2014-028508
Patent Document 2: Japanese Unexamined Patent Application, First Publication No. 2012-135980

SUMMARY OF THE INVENTION

Problem to be Solved by the Invention

When a laminate having high barrier properties to water vapor is manufactured using a fluorine-based resin having high barrier properties, it is required to provide a laminate excellent in moldability in addition to high barrier properties.

The present invention has been made in view of the above-mentioned circumstances, and an object thereof is to provide a laminate excellent in moldability, as well as a blister container and a press-through package each including the laminate.

Means for Solving the Problem

That is, the present invention has adopted the following configurations.
[1] A laminate comprising a substrate layer, an intermediate layer, and a fluorine-based resin layer in this order, and having a total film thickness of 400 μm or less, wherein a thickness of the intermediate layer is 5 μm or more and 50 μm or less, and an upper yield point stress of the laminate is 1,500 N/cm² or more.

[2] The laminate according to [1], further comprising a second intermediate layer and a second substrate layer in this order on a surface of the fluorine-based resin layer, the surface being opposite to a surface on which the intermediate layer is formed.
[3] The laminate according to [1] or [2], wherein the fluorine-based resin layer contains polychlorotrifluoroethylene.
[4] The laminate according to any one of [1] to [3], wherein the intermediate layer contains a polyethylene-based resin and a modified polyethylene-based resin.
[5] The laminate according to any one of [1] to [4], wherein the intermediate layer contains an acid-modified polyolefin resin, a resin containing an epoxy group, and an elastomer resin.
[6] The laminate according to any one of [1] to [5], wherein the thickness of the intermediate layer is 10 μm or more and 30 μm or less.
[7] The laminate according to any one of [2] to [6], wherein the second intermediate layer contains a polyethylene-based resin and a modified polyethylene-based resin.
[8] The laminate according to any one of [2] to [6], wherein the second intermediate layer contains an acid-modified polyolefin resin, a resin containing an epoxy group, and an elastomer resin.
[9] The laminate according to any one of [2] to [8], wherein a thickness of the second intermediate layer is 10 μm or more and 30 μm or less.
[10] The laminate according to any one of [1] to [9], wherein a water vapor permeability of the laminate is 0.5 g/m²/24 hours or less.
[11] A blister container comprising the laminate according to any one of [1] to [10].
[12] A press-through package comprising the laminate according to any one of [1] to [10].

Effects of Invention

According to the present invention, there can be provided a laminate excellent in moldability, as well as a blister container and a press-through package each including the laminate.

BEST MODE FOR CARRYING OUT THE INVENTION

The present invention will be described below based on a preferable embodiment.

Laminate

First Embodiment

A first embodiment of the laminate of the present invention will be described with reference to FIG. 1.

Figure 1:
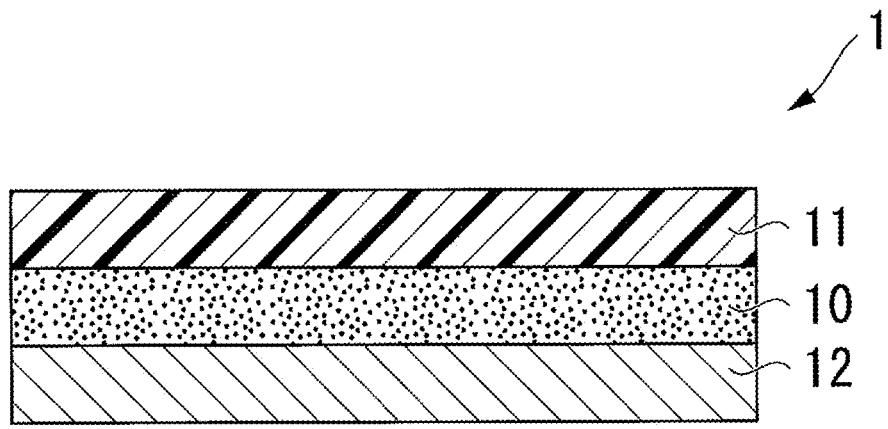
FIG. 1 is a schematic cross-sectional view of a laminate according to a first embodiment of the present invention.

In a laminate 1 of the present embodiment shown in FIG. 1, a substrate layer 12, an intermediate layer 10, and a fluorine-based resin layer 11 are laminated in this order. The intermediate layer 10 functions as an adhesive agent layer that bonds the fluorine-based resin layer 11 and the substrate layer 12, and the substrate layer 12 and the fluorine-based resin layer 11 are laminated with the intermediate layer 10 interposed therebetween.

The laminate 1 of the present embodiment has a three-layer structure of the substrate layer 12, the intermediate layer 10, and the fluorine-based resin layer 11. Since the laminate of a three-layer structure can be manufactured not through complicated steps, and the uniformity in each layer of the laminate is more improved, the laminate of a three-layer structure is preferable.

In the laminate of the present invention, an upper yield point stress measured under the following measuring conditions is 1,500 N/cm$^2$ or more, preferably 2,000 N/cm$^2$ or more, and more preferably 2,100 N/cm$^2$ or more.

By adjusting the upper yield point stress of the laminate to the above-mentioned lower limit value or more, a laminate can be obtained in which respective layers are adhered firmly and interlayer peeling is not generated.

By adjusting the upper yield point stress of the laminate to the above-mentioned lower limit value or more, the moldability at the time of deep draw molding is good, and when the laminate is used in a blister container or PTP, a container body can have sufficient hardness during its use. That is, at the time of deep draw molding, a deep drawn part of the laminate has a convex shape, and a portion that is expanded as compared with the original laminate is generated. However, when the upper yield point is the above-mentioned lower limit value or more, a force that the deep drawn part having a convex shape returns to the original shape becomes small, and the moldability of the laminate becomes good. Accordingly, a container ceases to be deformed also in some impact and manipulation at the time of handling. This allows the adaptability of the laminate to an automatic packaging line to be good, for example.

An upper limit value of the upper yield point stress is not particularly limited, and an example thereof can be 5,000 N/cm$^2$ or less.

The upper yield point stress can be controlled to the above-mentioned specific numerical range by adjusting the material and thickness of respective layers of the substrate layer, the fluorine-based resin layer, and the intermediate layer, and particularly, it is preferable that the upper yield point stress is controlled by the thickness of the substrate layer and the composition of the intermediate layer.

In the present embodiment, the upper yield point stress is measured under the following measuring conditions:
Measuring apparatus: Autograph 100 A type manufactured by Shimadzu Corporation
Measuring conditions: JIS K-6732 (tension speed: 50 mm/min, test temperature: 25° C.)
Shape and dimension of test piece: Dimension based on JIS K-7127 test piece type 5
Unit: N/cm$^2$, a value measured in accordance with JIS K-6732

Respective layers constituting the laminate of the present invention will be described below.

[Substrate Layer]

In the present embodiment, a material forming the substrate layer 12 is any one or more kinds of a polyolefin-based resin, a polyester-based resin, or a vinyl-based resin.

Examples of the polyolefin-based resin include a polyethylene resin, a polypropylene resin, a polymethylpentene resin, and the like.

Examples of the polyester-based resin include polyethylene terephthalate, polyethylene naphthalate, polyethylene isophthalate, polybutylene terephthalate, and the like.

Examples of the vinyl-based resin include a polyvinyl acetate-based resin, a polyvinyl chloride-based resin, and the like.

In the present embodiment, the polyester-based resin is preferable, and polyethylene terephthalate is more preferable.

In the present embodiment, by using any one or more kinds of the above-mentioned resins for forming the substrate layer 12, the moldability upon molding in drawing becomes good, for example.

In the present embodiment, a thickness of the substrate layer 12 is not particularly limited, and examples of a lower limit value include 50 μm or more, 80 μm or more, and 100 μm or more. Furthermore, examples of an upper limit value include 250 μm or less, 220 μm or less, and 200 μm or less.

The above-mentioned upper limit values and lower limit values can be arbitrarily combined.

[Intermediate Layer]

Intermediate Layer (1)

In the present embodiment, it is preferable to use, as the intermediate layer 10, an intermediate layer containing a polyethylene-based resin and a modified polyethylene-based resin (hereinafter, may be described as "intermediate layer (1)").

Examples of the polyethylene-based resin include linear low-density polyethylene (LLDPE), low-density polyethylene (LDPE), medium-density polyethylene (MDPE), and high-density polyethylene (HDPE), and it is preferable that the polyethylene-based resin is linear low-density polyethylene.

The modified polyethylene-based resin is a polyethylene-based resin modified with unsaturated carboxylic acid or a derivative of the unsaturated carboxylic acid, and has an acid functional group such as a carboxy group or a carboxylic anhydride group in the polyethylene-based resin. In the present embodiment, one obtained by acid-modifying the polyethylene-based resin is preferable.

Examples of the acid-modifying method include graft modification in which a polyethylene-based resin and an acid functional group-containing monomer are melted and kneaded in the presence of a radical polymerization initiator such as an organic peroxide or an aliphatic azo compound.

A polyethylene-based resin material before modification is not limited as long as it contains ethylene as a raw material monomer, and a known polyethylene-based resin is appropriately used. Specifically, examples thereof include ethylene-α-olefin copolymers such as an ethylene-propylene copolymer, an ethylene-1-butene copolymer, an ethylene-4-methyl-1-pentene copolymer, an ethylene-1-hexene copolymer, and an ethylene-1-octene copolymer; ethylene-based copolymer resins such as an ethylene-vinyl acetate copolymer, an ethylene-(meth)acrylic acid copolymer, and an ethylene-(meth)acrylic acid ester copolymer; and the like, in addition to the examples that are mentioned above as the polyethylene-based resin.

The acid functional group-containing monomer is a compound having an ethylenic double bond and a carboxy group or a carboxylic anhydride group in the same molecule, and examples thereof include various unsaturated monocarboxylic acids and dicarboxylic acids or acid anhydrides of dicarboxylic acids.

Examples of the acid functional group-containing monomer having a carboxy group (carboxy group-containing monomer) include α,β-unsaturated carboxylic acid monomers such as acrylic acid, methacrylic acid, maleic acid, nadic acid, fumaric acid, itaconic acid, citraconic acid, crotonic acid, isocrotonic acid, tetrahydrophthalic acid, and endo-bicyclo[2.2.1]-5-heptene-2,3-dicarboxylic acid (endic acid).

Examples of the acid functional group-containing monomer having a carboxylic anhydride group (carboxylic anhydride group-containing monomer) include unsaturated dicarboxylic anhydride monomers such as maleic anhydride, nadic anhydride, itaconic anhydride, citraconic anhydride, and endic anhydride.

These acid functional group-containing monomers may be used alone, or two or more kinds thereof may be used jointly, in components constituting the intermediate layer.

Inter alia, as the acid functional group-containing monomer, an acid functional group-containing monomer having an acid anhydride group is preferable, a carboxylic anhydride group-containing monomer is more preferable, and maleic anhydride is particularly preferable.

When part of the acid functional group-containing monomer used for acid modification is unreacted, in order to prevent reduction in an adhesive force due to the unreacted acid functional group-containing monomer, it is preferable to use one from which the unreacted acid functional group-containing monomer has been removed in advance.

It is preferable that the modified polyethylene-based resin is maleic anhydride-modified polyethylene in the present embodiment.

In the present embodiment, when the total mass of the polyethylene-based resin and the modified polyethylene-based resin is set to 100%, a lower limit value of a proportion of the polyethylene-based resin to the total mass of the polyethylene-based resin and the modified polyethylene-based resin is preferably 10% or more and further preferably 20% or more. Furthermore, an upper limit value of the proportion of the polyethylene-based resin to the total mass of the polyethylene-based resin and the modified polyethylene-based resin is preferably 70% or less and further preferably 60% or less. For example, a mixing ratio of the polyethylene-based resin and the modified polyethylene-based resin can take [polyethylene-based resin]:[modified polyethylene-based resin]=20:80 to 60:40.

In the present embodiment, by using the intermediate layer (1) containing a mixed material of the polyethylene-based resin and the modified polyethylene-based resin, the adhesion between the fluorine-based resin layer and the substrate layer can be improved. For this reason, a laminate that hardly causes interlayer peeling can be provided.

Intermediate Layer (2)

In the present embodiment, it is also preferable to use, as the intermediate layer 10, an intermediate layer containing an acid-modified polyolefin resin, a resin containing an epoxy group, and an elastomer resin (hereinafter, described as "intermediate layer (2)").

Herein, respective components contained in the intermediate layer (2) will be described.

Acid-Modified Polyolefin Resin

An acid-modified polyolefin resin (hereinafter, described as "component (A)") is a polyolefin-based resin modified with unsaturated carboxylic acid or a derivative of the unsaturated carboxylic acid, and has an acid functional group such as a carboxy group or a carboxylic anhydride group in the polyolefin-based resin.

The component (A) is obtained by modification of the polyolefin-based resin with unsaturated carboxylic acid or a derivative of the unsaturated carboxylic acid, copolymerization of an acid functional group-containing monomer and olefins, or the like. Inter alia, as the component (A), one obtained by acid-modifying the polyolefin-based resin is preferable.

Examples of the acid-modifying method include graft modification in which a polyolefin resin and an acid functional group-containing monomer are melted and kneaded in the presence of a radical polymerization initiator such as an organic peroxide or an aliphatic azo compound.

Examples of the above-mentioned polyolefin-based resin include polyethylene, polypropylene, poly-1-butene, polyisobutylene, a random copolymer of propylene and ethylene or α-olefin, a block copolymer of propylene and ethylene or α-olefin, and the like. Inter alia, polypropylene-based resins such as homopolypropylene (propylene homopolymer; hereinafter, may be referred to as "homo PP"), a block copolymer of propylene-ethylene (hereinafter, may be referred as "block PP"), and a random copolymer of propylene-ethylene (hereinafter, may be referred to as "random PP") are preferable, and random PP is particularly preferable.

Examples of the above-mentioned olefins in the case of copolymerization include olefin-based monomers such as ethylene, propylene, 1-butene, isobutylene, 1-hexene, and α-olefin.

The acid functional group-containing monomer is a compound having an ethylenic double bond and a carboxy group or a carboxylic anhydride group in the same molecule, and examples thereof include various unsaturated monocarboxylic acids and dicarboxylic acids or acid anhydrides of dicarboxylic acids.

Examples of the acid functional group-containing monomer having a carboxy group (carboxy group-containing monomer) include α,β-unsaturated carboxylic acid monomers such as acrylic acid, methacrylic acid, maleic acid, nadic acid, fumaric acid, itaconic acid, citraconic acid, crotonic acid, isocrotonic acid, tetrahydrophthalic acid, and endo-bicyclo[2.2.1]-5-heptene-2,3-dicarboxylic acid (endic acid).

Examples of the acid functional group-containing monomer having a carboxylic anhydride group (carboxylic anhydride group-containing monomer) include unsaturated dicarboxylic anhydride monomers such as maleic anhydride, nadic anhydride, itaconic anhydride, citraconic anhydride, and endic anhydride.

These acid functional group-containing monomers may be used alone, or two or more kinds thereof may be used jointly in the component (A).

Inter alia, as the acid functional group-containing monomer, since reactivity with a component (B) described later is high, an acid functional group-containing monomer having an acid anhydride group is preferable, a carboxylic anhydride group-containing monomer is more preferable, and maleic anhydride is particularly preferable.

When a part of the acid functional group-containing monomer used for acid modification is unreacted, in order to prevent reduction in an adhesive force due to the unreacted acid functional group-containing monomer, it is preferable to use, as the component (A), one from which the unreacted acid functional group-containing monomer has been removed in advance. Herein, "unreacted" means that the monomer is not subjected to acid modification.

Inter alia, from the viewpoint that high adhesion to the fluorine-based resin layer can be exerted, maleic anhydride-modified polypropylene is preferable as the component (A).

Resin Containing Epoxy Group

In the present embodiment, it is preferable that the resin containing an epoxy group (hereinafter, described as "component (B)") is a component having an epoxy group and a vinyl group. It is preferable that the resin containing an epoxy group has a 1,2-vinyl structure, and epoxiclized polybutadiene in which butadiene has been partially epoxiclized is more preferable. One in which 1,2-polybutadiene has been partially epoxidized is particularly preferable.

Examples of the resin containing an epoxy group usable in the present embodiment include liquid polybutadiene JP-100 and JP-200 of NIPPON SODA CO., LTD., Adekacizer BF-1000 of ADEKA CORPORATION, and the like.

It is preferable that a number average molecular weight of the resin containing an epoxy group is 500 or more and 4,000 or less.

By adjusting the number average molecular weight of the resin containing an epoxy group to the above-mentioned upper limit value or less, reduction in pressure-sensitive adhesiveness due to becoming the solid state at an ambient temperature is suppressed, and reduction in adhesiveness can be prevented.

A number average molecular weight in the present embodiment is a value in terms of polystyrene, which is measured by gel permeation chromatography (GPC).

It is particularly preferable that, as the resin containing an epoxy group, epoxydized polybutadiene is used.

Elastomer Resin

An elastomer resin (hereinafter, described as "component (C)") should be a component with properties as an elastomer, and examples thereof include a styrene-based elastomer, an acrylic-based elastomer, a urethane-based elastomer, an olefin-based elastomer, an ester-based elastomer, and the like.

Inter alia, the olefin-based elastomer is preferable, and examples thereof include a block copolymer having a hard segment including polystyrene or the like and a soft segment including polyethylene, polybutadiene, polyisoprene or the like. Examples of an olefin-based polymer usable in the olefin-based elastomer include copolymers of aromatic olefin-aliphatic olefin such as a styrene-butadiene copolymer, a styrene-isoprene copolymer, and a styrene-ethylene copolymer.

In the present embodiment, it is preferable that the component (C) is contained in an amount of 1 part by mass or more and 50 parts by mass or less, based on 50 parts by mass or more and 99 parts by mass or less of the (A) component. Inter alia, it is more preferable that the component (B) is contained in an amount of 15 parts by mass or more and 35 parts by mass or less, based on 65 parts by mass or more and 85 parts by mass or less of the component (C).

In the present embodiment, a thickness of the intermediate layer 10 is 5 µm or more and 50 µm or less, and preferably 10 µm or more and 30 µm or less.

In the present embodiment, by adjusting the thickness of the intermediate layer 10 to the above-mentioned lower limit value or more, the adhesion can be improved, and interlayer peeling can be prevented. Furthermore, by adjusting the thickness of the intermediate layer to the above-mentioned upper limit value or less, deterioration of moldability due to an increase in film thickness can be prevented.

[Fluorine-Based Resin Layer]

As the fluorine-based resin material used for the fluorine-based resin layer 11, polytetrafluoroethylene (PTFE), a tetrafluoroethylene-perfluoroalkyl vinyl ether copolymer (PFA), a tetrafluoroethylene-hexafluoropropylene copolymer (FEP), tetrafluoroethylene-hexafluoropropylene-perfluoroalkyl vinyl ether (EPA), a tetrafluoroethylene-ethylene copolymer (ETFE), polyvinylidene fluoride (PVDF), polychlorotrifluoroethylene (PCTFE), a chlorotrifluoroethylene-ethylene copolymer (ECTFE), a mixture of one or two or more kinds thereof, and the like can be used, and polychlorotrifluoroethylene (PCTFE) is preferable.

In the present embodiment, a thickness of the fluorine-based resin layer 11 is not particularly limited, and as an example, a lower limit value is preferably 5 µm or more and more preferably 10 µm or more. Furthermore, an upper limit value is preferably 200 µm or less, preferably 170 µm or less, and further preferably 150 µm or less.

The above-mentioned upper limit values and lower limit values can be arbitrarily combined.

In the present embodiment, by adjusting the thickness of the fluorine-based resin layer 11 to the above-mentioned lower limit value or more, the water vapor permeability of the laminate can be reduced, and for example, when the laminate is used in a press-through package for medicines, high dampproofness can be exerted, and deterioration of the content due to water vapor can be prevented.

In the present embodiment, by adjusting the thickness of the fluorine-based resin layer 11 to the above-mentioned upper limit value or less, production cost can be reduced.

Second Embodiment

A second embodiment of the laminate of the present invention will be described with reference to FIG. 2.

Figure 2:
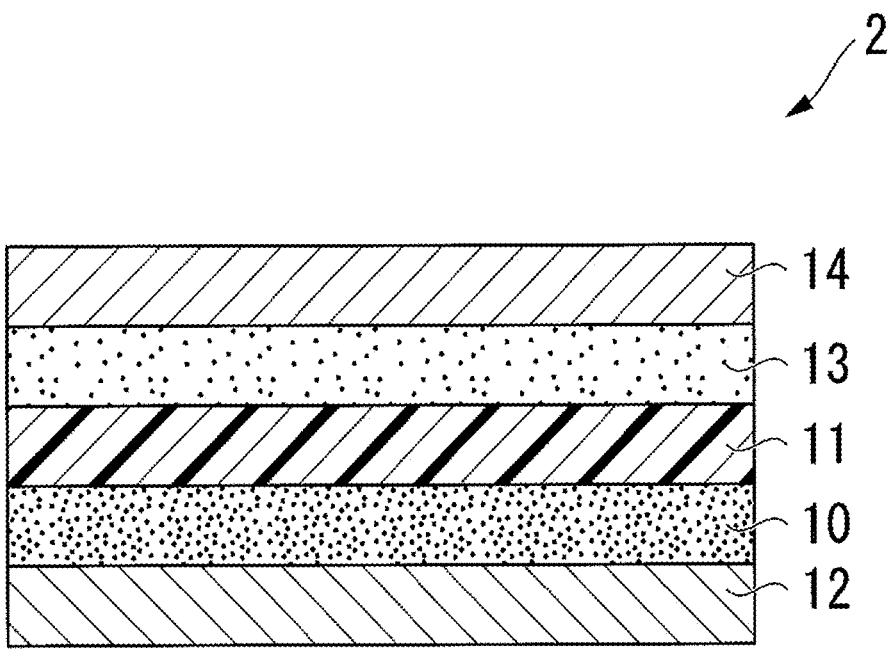
FIG. 2 is a schematic cross-sectional view of a laminate according to a second embodiment of the present invention.

In a laminate 2 of the present embodiment shown in FIG. 2, a substrate layer 12, an intermediate layer 10, a fluorine-based resin layer 11, a second intermediate layer 13, and a second substrate layer 14 are laminated in this order.

Since the strength of the laminate of a five-layer configuration is increased, the laminate is preferable. Furthermore, since curling is hardly generated in the laminate of a five-layer configuration, the laminate is preferable.

Respective materials constituting the substrate layer, the intermediate layer, and the fluorine-based resin layer in the present embodiment are the same as the respective materials described in the above-mentioned first embodiment.

The description concerning materials constituting the second substrate layer 14 is the same as that in the case of the above-mentioned substrate layer 12. The second substrate layer 14 and the substrate layer 12 may have the same material or different materials, and preferably the same material.

The description concerning materials constituting the second intermediate layer 13 is the same as that in the case of the above-mentioned intermediate layer 10. The second intermediate layer 13 and the intermediate layer 10 may have the same material or different materials, and preferably the same material.

In the laminate of the present embodiment, an upper yield point stress measured under measuring conditions described below is 1,500 N/cm$^2$ or more, preferably 2,000 N/cm$^2$ or more, and more preferably 2,100 N/cm$^2$ or more.

By adjusting the upper yield point stress of the laminate to the above-mentioned lower limit value or more, a laminate can be obtained in which respective layers are adhered firmly and interlayer peeling is not generated.

Furthermore, by adjusting the upper yield point stress of the laminate to the above-mentioned lower limit value or more, the deep drawing moldability of the laminate is further improved. For this reason, for example, the adaptability of the laminate to an automatic packaging line can be made good.

By adjusting the upper yield point stress of the laminate of the present embodiment to the above-mentioned lower limit value or more, similarly to the above-mentioned first embodiment, the moldability at the time of deep draw molding is good, and when the laminate is used in a blister container or PTP, a container body can have sufficient hardness during its use.

In the present embodiment, an upper limit value of the upper yield point stress is not particularly limited, and as an example, the upper limit value can be 5,000 N/cm² or less.

The upper yield point stress can be controlled to the above-mentioned specific numerical range, by adjusting the material and thickness of respective layers of the substrate layer 12, the intermediate layer 10, the fluorine-based resin layer 11, the second intermediate layer 13, and the second substrate layer 14, and particularly, it is preferable that the upper yield point stress is controlled by the thicknesses of the substrate layers 12 and 14, and the compositions of the intermediate layer 10 and second intermediate layer 13.

In the present embodiment, a material constituting the substrate layer 12 and a material constituting the second substrate layer 14 may be the same or different, and are preferably the same resin materials.

The thickness of the second substrate layer 14 to that of the substrate layer 12 is preferably 0.5 times to 1.1 times, more preferably 0.9 times to 1.1 times, and particularly preferably 0.95 times to 1.05 times.

In the present embodiment, a material constituting the intermediate layer 10 and a material constituting the second intermediate layer 13 may be the same or different, and are preferably the same resin materials.

The thickness of the second intermediate layer 13 to that of the intermediate layer 10 is more preferably 0.9 times to 1.1 times, and particularly preferably 0.95 times to 1.05 times.

In the laminate of the present invention, an upper limit of a total film thickness is 400 μm or less and preferably 300 μm or less. Furthermore, a lower limit of the total film thickness is preferably 80 μm or more, and more preferably 200 μm or more. By setting the total film thickness to the above-mentioned range, the content is easily protected, and also after the laminate is molded, the resulting material is easily stored and used.

Furthermore, a water vapor permeability of the laminate of the present invention is preferably 0.5 g/m²/24 hours or less, more preferably 0.4 g/m²/24 hours or less, and particularly preferably 0.3 g/m²/24 hours or less.

<Blister Container, Press-Through Package>

A blister container and press-through package according to the embodiments of the present invention are manufactured by deep drawing the above-mentioned laminate of the first or second embodiment of the present invention.

When the above-mentioned laminate 1 according to the first embodiment of the present invention is used, the fluorine-based resin layer 11 can face an internal side and can also face an external side, and it is preferable that the laminate 1 is molded so that the fluorine-based resin layer 11 faces an external side.

The press-through package according to the embodiments of the present invention is used, for example, in individual packaging for tablets or capsules.

Since the above-mentioned laminate of the present invention has low water vapor permeability, deterioration of the content of tablets, capsules, or the like can be prevented.

It is preferable that the laminate according to the first embodiment is manufactured by simultaneously melting and extrusion-molding a resin that is to be a raw material for the above-mentioned substrate layer, a resin that is to be a raw material for the above-mentioned intermediate layer, and a resin that is to be a raw material for the above-mentioned fluorine-based resin layer.

Furthermore, it is preferable that the laminate according to the second embodiment is manufactured by simultaneously melting and extrusion-molding a resin that is to be a raw material for the above-mentioned substrate layer, a resin that is to be a raw material for the above-mentioned intermediate layer, a resin that is to be a raw material for the above-mentioned fluorine-based resin layer, a resin that is to be a raw material for the above-mentioned second intermediate layer, and a resin that is to be a raw material for the above-mentioned second substrate layer.

EXAMPLES

The present invention will be described in further detail below by way of Examples, but the present invention is not limited by these Examples.

Laminate of Three-Layer Configuration

Examples 1 to 6, Comparative Examples 1 and 2

Laminates of a three-layer configuration each having a substrate layer, an intermediate layer, and a fluorine-based resin layer in this order were manufactured. Resins that are to be raw materials for respective layers shown in Table 1, which had each been heated and melted separately, were subjected to multilayer film formation using an extruder that can perform co-extrusion multilayer molding, and laminates of a three-layer configuration having a substrate layer, an intermediate layer, and a fluorine-based resin layer in this order were obtained.

The upper yield point stress of the obtained each laminate was measured by the following method. In Comparative Example 2, interlayer peeling was caused after manufacturing of the laminate, so that the upper yield point stress could not be measured.

[Upper Yield Point Stress]

An upper yield point stress was measured under the following measuring conditions:
Measuring apparatus: Autograph 100 A type manufactured by Shimadzu Corporation
Measuring conditions: JIS K-6732 (tension speed: 50 mm/min, test temperature: 25° C.)
Shape and dimension of test piece: Dimension based on JIS K-7127 test piece type 5
Unit: N/cm², value measured in accordance with JIS K-6732

TABLE 1

|  | Substrate layer [μm] | Intermediate layer [μm] | Fluorine-based resin layer [μm] | Total film thickness [μm] | Upper yield point stress [N/cm²] |
|---|---|---|---|---|---|
| Example 1 | PET [100] | Intermediate layer 1 [20] | PCTFE [30] | 150 | 1,550 |
| Example 2 | PET [150] | Intermediate layer 1 [20] | PCTFE [30] | 200 | 2,200 |
| Example 3 | PET [80] | Intermediate layer 1 [20] | PCTFE [150] | 250 | 2,500 |
| Example 4 | PET [250] | Intermediate layer 1 [20] | PCTFE [30] | 300 | 3,100 |
| Example 5 | PET [150] | Intermediate layer 2 [20] | PCTFE [30] | 200 | 2,300 |

TABLE 1-continued

|  | Substrate layer [μm] | Intermediate layer [μm] | Fluorine-based resin layer [μm] | Total film thickness [μm] | Upper yield point stress [N/cm²] |
|---|---|---|---|---|---|
| Example 6 | PET [150] | Intermediate layer 3 [20] | PCTFE [30] | 200 | 2,100 |
| Comparative Example 1 | PET [50] | Intermediate layer 1 [20] | PCTFE [30] | 100 | 1,200 |
| Comparative Example 2 | PET [150] | Intermediate layer 4 [20] | PCTFE [30] | 200 | Unmeasurable |

In Table 1, respective symbols mean the following materials. A numerical value in parenthesis is the thickness of each layer.

PET: Polyethylene terephthalate resin. NOVAPEXI4 manufactured by Mitsubishi Chemical Corporation is used.

PCTFE Polychlorotrifluoroethylene resin. DF0050-C1 manufactured by DAIKIN INDUSTRIES, LTD. is used.

Intermediate layers 1 to 4: Intermediate layers 1 to 4 shown in the following Table 2. A ratio of respective materials in Table 2 is a mass ratio (%).

TABLE 2

| Intermediate layer 1 | Linear low-density polyethylene (LLDPE)/ ADMER SE (maleic acid-modified polyethylene) = 50/50 |
| Intermediate layer 2 | Polyethylene/elastomer/ epoxidized polybutadiene = 70/29/1 |
| Intermediate layer 3 | Linear low-density polyethylene (LLDPE)/ ADMER SE (maleic acid-modified polyethylene) = 10/90 |
| Intermediate layer 4 | Maleic acid-modified polyethylene |

Assessment

Concerning respective laminates of Examples 1 to 6 and Comparative Example 1, the following respective tests were performed. Since the laminate of Comparative Example 2 caused interlayer peeling, the upper yield point stress could not be assessed.

[Measurement of Water Vapor Permeability]

Concerning the laminates obtained according to the above-mentioned <Laminate of Three-Layer Configuration>, a water vapor permeability was measured under conditions of a cell temperature of 40° C. and a relative humidity of 90% RH using a water vapor permeability meter (manufactured by Systech Instruments, product name "L80-5000"), according to JIS K7129: 2008 (Method A). The water vapor permeability is expressed by the gram number of water vapor per area of 1 square meter, which permeated for 24 hours [g/m²/24 h].

[Moldability]

The laminate moldability was accessed based on the following criteria by visually observing the presence or absence of molding defective when a press-through package was molded.

⊙; Thickness deviation of the deep drawn part and shape retention after deep drawing were very good.

○; Thickness deviation of the deep drawn part and shape retention after deep drawing were generally good.

Δ; The deep drawn part was slightly deviated in the thickness, or shape retention after deep drawing was not achieved in some cases.

×; The deep drawn part was deviated in the thickness, or a shape of the deep drawn part was not retained after deep drawing. Alternatively, the laminate caused interlayer peeling and could not retain a shape as a molded article after being molded.

TABLE 3

|  | Water vapor permeability [g/m²/24 h] | Moldability |
|---|---|---|
| Example 1 | 0.21 | Δ |
| Example 2 | 0.20 | ⊙ |
| Example 3 | 0.05 | ⊙ |
| Example 4 | 0.19 | ○ |
| Example 5 | 0.20 | ○ |
| Example 6 | 0.20 | ⊙ |
| Comparative Example 1 | 0.25 | X |
| Comparative Example 2 | Unmeasurable | Film unformable |

As shown in the above-mentioned results, the laminates of Examples 1 to 6, which had an upper yield point stress of 1,500 N/cm² or more and to which the present invention had been applied, had low water vapor permeability and further were also excellent in moldability. The laminate of Comparative Example 1 having an upper yield point stress considerably lower than 1,500 N/cm² had a high water vapor permeability and was also not good in moldability.

Laminate of Five-Layer Configuration

Examples 7 to 11, Comparative Examples 3 and 4

Laminates of a five-layer configuration each having a substrate layer, an intermediate layer, a fluorine-based resin layer, a second intermediate layer, and a second substrate layer in this order were manufactured. Resins that were to be raw materials for respective layers shown in Table 4, which had each been heated and melted separately, were subjected to multilayer film formation using an extruder that can perform co-extrusion multilayer molding, and laminates of a five-layer configuration having a substrate layer, an intermediate layer, a fluorine-based resin layer, a second intermediate layer, and a second substrate layer in this order were obtained.

TABLE 4

|  | Substrate layer [μm] | Intermediate layer [μm] | Fluorine-based resin layer [μm] | Second intermediate layer [μm] | Second substrate layer [μm] | Total film thickness [μm] | Upper yield point stress [N/cm²] |
|---|---|---|---|---|---|---|---|
| Example 7 | PET [50] | Intermediate layer 1 [20] | PCTFE [20] | Intermediate layer 1 [20] | PET [50] | 160 | 1,500 |
| Example 8 | PET [100] | Intermediate layer 1 [20] | PCTFE [20] | Intermediate layer 1 [20] | PET [100] | 260 | 2,600 |

TABLE 4-continued

|  | Substrate layer [μm] | Intermediate layer [μm] | Fluorine-based resin layer [μm] | Second intermediate layer [μm] | Second substrate layer [μm] | Total film thickness [μm] | Upper yield point stress [N/cm$^2$] |
|---|---|---|---|---|---|---|---|
| Example 9 | PET [100] | Intermediate layer 2 [20] | PCTFE [20] | Intermediate layer 2 [20] | PET [100] | 260 | 2,700 |
| Example 10 | PET [100] | Intermediate layer 3 [20] | PCTFE [20] | Intermediate layer 3 [20] | PET [100] | 260 | 2,650 |
| Example 11 | PET [50] | Intermediate layer 3 [20] | PCTFE [150] | Intermediate layer 3 [20] | PET [50] | 290 | 2,600 |
| Comparative Example 3 | PET [20] | Intermediate layer 1 [20] | PCTFE [20] | Intermediate layer 1 [20] | PET [20] | 100 | 1,200 |
| Comparative Example 4 | PET [100] | Intermediate layer 4 [20] | PCTFE [20] | Intermediate layer 4 [20] | PET [100] | 140 | Unmeasurable |

In Table 4, respective symbols mean the following materials. A numerical value in parenthesis is the thickness of each layer.
PET: Polyethylene terephthalate resin. NOVAPEXI4 manufactured by Mitsubishi Chemical Corporation is used.
PCTFE Polychlorotrifluoroethylene resin. DF0050-C1 manufactured by DAIKIN INDUSTRIES, LTD. is used.
Intermediate layers 1 to 4: Intermediate layers 1 to 4 shown in the above-mentioned Table 2.
[Upper Yield Point Stress]
The upper yield point stress was measured by the same method as that described above. In Comparative Example 4, interlayer peeling was caused after manufacturing of the laminate, so that the upper yield point stress could not be measured.
Assessment
Concerning respective laminates of Examples 7 to 11 and Comparative Example 3, the water vapor permeability and the moldability were assessed by the same methods as those described above. The results thereof are described in Table 5. In Comparative Example 4, interlayer peeling was caused after manufacturing of the laminate, so that the water vapor permeability and the moldability could not be assessed.

TABLE 5

|  | Water vapor permeability [g/m$^2$/24 h] | Moldability |
|---|---|---|
| Example 7 | 0.32 | ⊙ |
| Example 8 | 0.30 | ⊙ |
| Example 9 | 0.30 | ○ |
| Example 10 | 0.30 | ⊙ |
| Example 11 | 0.05 | ○ |
| Comparative Example 3 | 0.33 | X |
| Comparative Example 4 | Unmeasurable | Film unformable |

As shown in the above-mentioned results, the laminates of Examples 7 to 11, to which the present invention had been applied, had low water vapor permeability and were also excellent in moldability. Concerning the laminate of Comparative Example 3, the water vapor permeability was equivalent to that of Examples, but the moldability was not good.

What is claimed is:

1. A laminate comprising a substrate layer, an intermediate layer, a fluorine-based resin layer, a second intermediate layer, and a second substrate layer in this order, and having a total film thickness of 400 μm or less,
   wherein
   each of said intermediate layer and said second intermediate layer contains linear low-density polyethylene and maleic anhydride-modified polyethylene, or contains an acid-modified polyolefin resin, epoxidized polybutadiene, and an elastomer resin,
   a thickness of said intermediate layer is 5 μm or more and 50 μm or less, and
   an upper yield point stress of said laminate is 1,500 N/cm2 or more.

2. The laminate according to claim 1, wherein said fluorine-based resin layer contains polychlorotrifluoroethylene.

3. The laminate according to claim 1, wherein the thickness of said intermediate layer is 10 μm or more and 30 μm or less.

4. The laminate according to claim 1, wherein a thickness of said second intermediate layer is 10 μm or more and 30 μm or less.

5. The laminate according to claim 1, wherein a water vapor permeability of said laminate is 0.5 g/m2/24 hours or less.

6. A blister container comprising the laminate according to claim 1.

7. A press-through package comprising the laminate according to claim 1.

* * * * *